US008152222B2

(12) United States Patent
Takai et al.

(10) Patent No.: US 8,152,222 B2
(45) Date of Patent: Apr. 10, 2012

(54) ROUTING STRUCTURE OF OPERATING CABLE OF VEHICLE COMPRISING POWER SLIDE DOOR

(75) Inventors: Shirena Takai, Kawachi-gun (JP); Masafumi Ishikawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 12/876,446

(22) Filed: Sep. 7, 2010

(65) Prior Publication Data

US 2011/0057473 A1 Mar. 10, 2011

(30) Foreign Application Priority Data

Sep. 8, 2009 (JP) ................................ 2009-207306

(51) Int. Cl.
*B60J 5/06* (2006.01)

(52) U.S. Cl. ....................................................... 296/155

(58) Field of Classification Search .................. 296/155; 49/352

See application file for complete search history.

(56) References Cited

U.S. PATENT DOCUMENTS 6,808,225 B2 * 10/2004 Moriyama ................. 296/146.6
7,268,296 B2 * 9/2007 Goto et al. .................. 174/72 A
7,651,135 B2 * 1/2010 Hirotani ........................ 280/802

FOREIGN PATENT DOCUMENTS

DE 2434748 A * 2/1976
DE 2439497 A * 2/1976
JP 2002-038814 2/2002
JP 2003-220829 A 8/2003
JP 2003-326970 A 11/2003
JP 2004-122949 A 4/2004
JP 2006-282122 A 10/2006
JP 2009-227192 A 10/2009

* cited by examiner

*Primary Examiner* — Hilary Gutman

(74) *Attorney, Agent, or Firm* — Carrier Blackman & Associates, P.C.; Joseph P. Carrier; William D. Blackman

(57) ABSTRACT

A routing structure of an operating cable of a vehicle comprising a power slide door, comprises: a retractor of a seatbelt device placed between a vehicle body panel and an interior material covering an inner side of a vehicle body panel facing an interior of a vehicle chamber; a webbing pulled out from the retractor, the webbing being passed through an opening of the interior material, and pulled out from a back part of the interior material towards an inner side of the vehicle chamber; the operating cable for the power slide door routed between the vehicle body panel and the interior material by crossing over a back part of the webbing, wherein a restricting piece, restricting a displacement of the operating cable towards a direction approaching the webbing, is provided on the interior material.

4 Claims, 5 Drawing Sheets

ROUTING STRUCTURE OF OPERATING CABLE OF VEHICLE COMPRISING POWER SLIDE DOOR

The present application claims priority on Japanese Patent Application No. 2009-207306, filed Sep. 8, 2009, the content of which is incorporated herein by reference.

BACKGROUND OF THE INVENTION

1. Field of the Invention

The present invention relates to a routing structure of an operating cable of a vehicle comprising a power slide door.

2. Description of the Related Art

According to a known power slide door, a slide door of a side part of a vehicle is operated by the power of a motor. (See, for example, Japanese Unexamined Patent Application, First Publication No. 2002-38814.)

A power slide door is normally configured so that a center rail is provided on a vehicle body panel at a rear side of a door opening part, and a door main body is connected to an operating cable routed along this center rail. The operating cable comprises a pair of front and rear cables being a cable for winding up and a cable for unwinding. These cables are operated by a motor of a drive unit to be winded up and unwound. The drive unit is provided at an interior side of a vehicle body panel. The front and rear cables are respectively pulled out towards an exterior of the vehicle from a front and rear position of the center rail. An end of each cable is connected to the door main body at the center rail at the exterior side of the vehicle.

By the way, a slide door of this type is often placed at a side of a rear seat of the vehicle. When, for example, a retractor of a seat belt device is placed at a rear rim of a door opening part, there is a concern that a webbing pulled out from the retractor may interfere with the operating cable.

In other words, a retractor of a seatbelt device is fixed to the vehicle body panel at a back side of an interior material covering the interior of the vehicle chamber. A webbing pulled out from the retractor is placed along a back surface of the interior material at a lower side of the pillar part. The webbing is then passed through an opening of the interior material, and is pulled out towards the interior side of the vehicle chamber. On the other hand, the power slide door is configured so that a drive unit is placed at an interior side of the vehicle body panel, and an operating cable (a cable at a front part side) pulled out from the drive unit is pulled out towards the exterior side of the vehicle by penetrating the base part position of the pillar part of the vehicle body panel. At the base part position of the pillar part, an operating cable (a cable at a front part side) of the power slide door is routed so as to cross over a back part of the webbing, inside a narrow space surrounded by the vehicle body panel and an interior material.

Further, when the motor drives and operates the operating cable while the power slide door is operated, the operating cable is bent. At this time, there is a high possibility that the operating cable interfere with a back surface of the webbing.

SUMMARY OF THE INVENTION

The present invention is made considering the problems described above. Accordingly, an object of the present invention is to provide a routing structure of an operating cable of a vehicle comprising a power slide door such that an interference between a webbing of a seatbelt device and the operating cable may be prevented in advance.

(1) Namely, a routing structure of an operating cable of a vehicle comprising a power slide door according to an aspect of the present invention comprises: a retractor of a seatbelt device placed between a vehicle body panel and an interior material covering an inner side of a vehicle body panel facing an interior of a vehicle chamber; a webbing pulled out from the retractor, the webbing being passed through an opening of the interior material, and pulled out from a back part of the interior material towards an inner side of the vehicle chamber; the operating cable for the power slide door routed between the vehicle body panel and the interior material by crossing over a back part of the webbing, wherein a restricting piece, restricting a displacement of the operating cable towards a direction approaching the webbing, is provided on the interior material.

(2) In addition, the routing structure of the operating cable of the vehicle comprising the power slide door may be configured as follows: the restricting piece comprises a locking hook restricting a downward displacement of the operating cable.

Therefore, a downward displacement of the operating cable is restricted by a locking hook. Accordingly, the operating cable is prevented from being positioned lower than a restricted position provided by a restriction piece.

(3) In addition, the routing structure of the operating cable of the vehicle comprising the power slide door may be configured as follows: the restricting piece is integrated with a lower part of a pillar garnish covering an inner side of a pillar part of a vehicle body panel facing an interior of the vehicle chamber.

According to the above aspect of the present invention described in (1) above, a displacement of the operating cable in a direction approaching the webbing is restricted by the restriction piece of the interior material. Therefore, an interference between the webbing of a seatbelt device and the operating cable may be prevented in advance.

According to the above aspect of the present invention described in (2) above, a downward disposition of the operating cable is restricted by the locking hook. Therefore, the operating cable can constantly be kept at the restricted position provided by the restricting piece. In this way, an interference between the webbing of a seatbelt device and the operating cable may be further prevented in advance.

According to the above aspect of the present invention described in (3) above, a displacement of the operating cable in a direction approaching the webbing is reliably restricted by the restriction piece provided so as to be integrated with a lower part of a pillar garnish. Hence, an interference between a webbing of a seatbelt device and the operating cable may be prevented in advance.

DETAILED DESCRIPTION OF THE PREFERRED EMBODIMENTS

Hereunder, a first embodiment of the present invention is described with reference to the diagrams. In the following description, the front, rear, upper, and lower directions refer to the front, rear, upper and lower directions with respect to a vehicle body, unless otherwise specifically noted.

Figure 1:
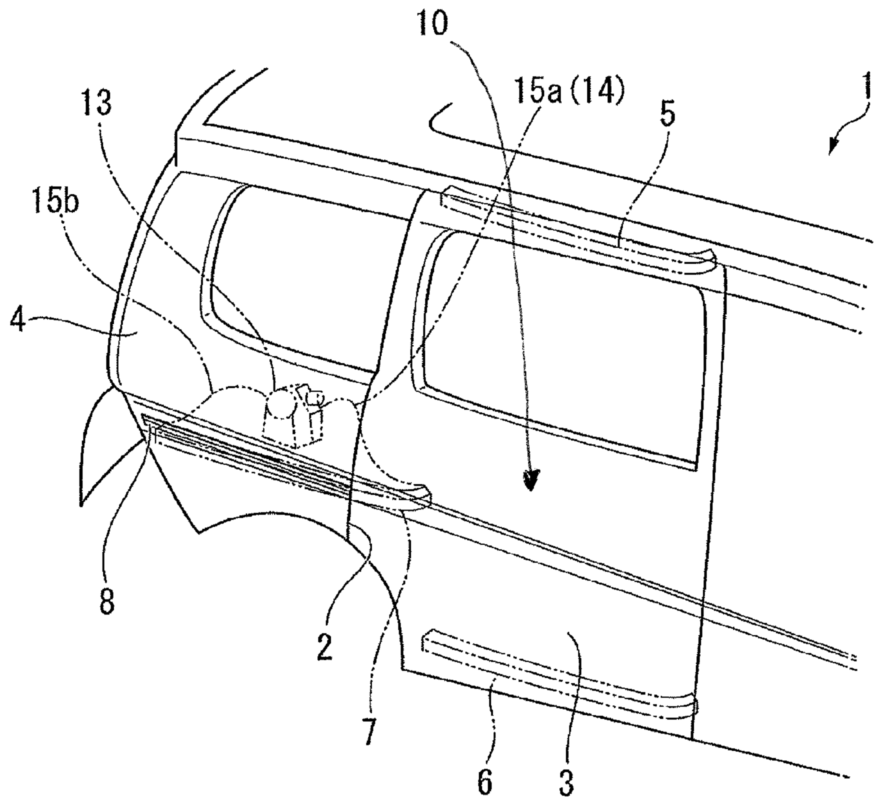
FIG. 1 is a perspective view of a vehicle according to an embodiment of the present invention seen from outside the vehicle.
Figure 2:
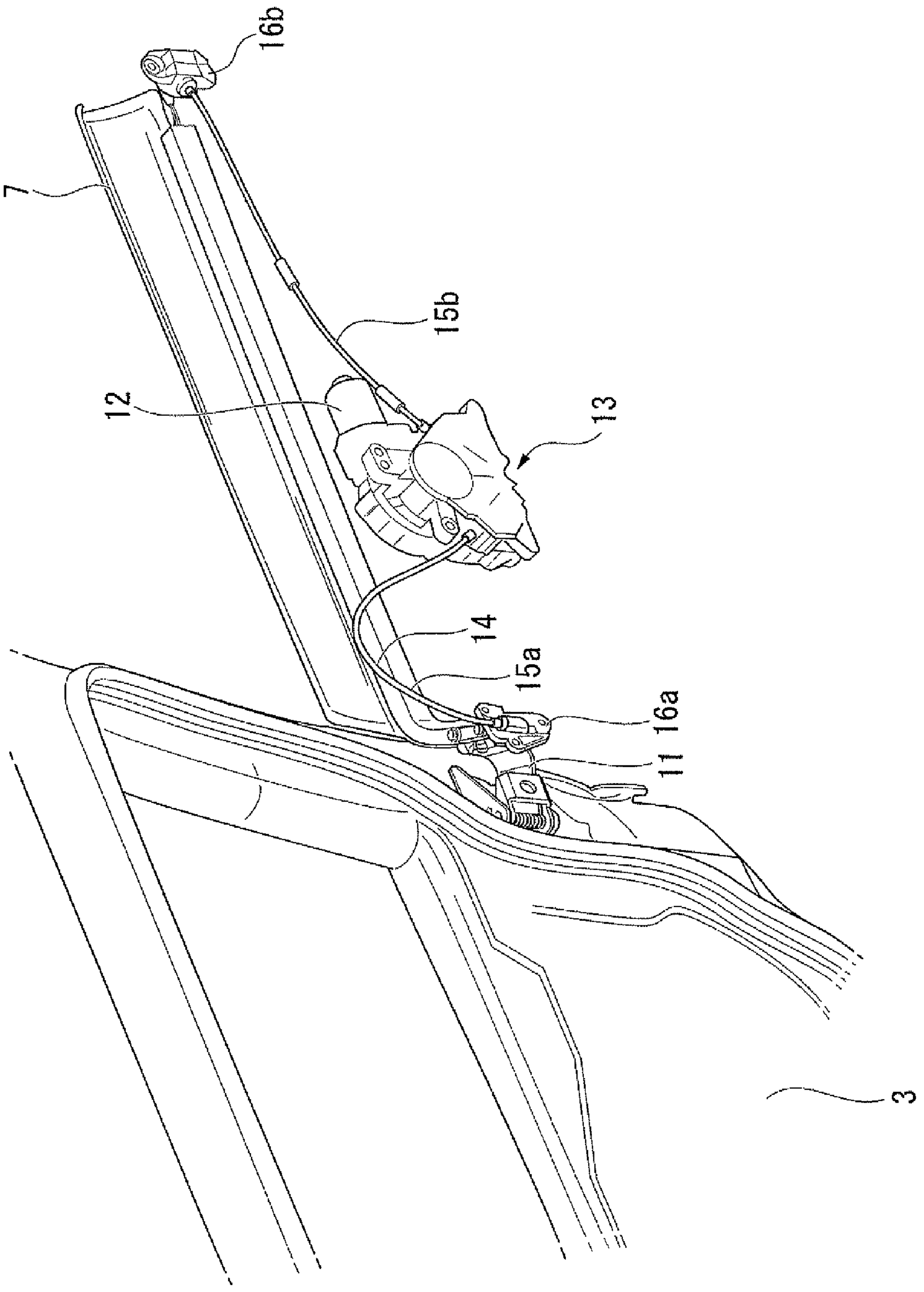
FIG. 2 is a perspective view of primary components of a power slide door according to an embodiment of the present invention seen from inside a vehicle chamber.

FIG. 1 is a diagram showing an exterior appearance of a vehicle 1, being a mini-van type, comprising a power slide door 10. FIG. 1 also shows main components of the power slide door 10. FIG. 2 is a diagram showing the main components of the power slide door 10 from inside the vehicle chamber. FIG. 2 also shows a door main body 3.

As shown in FIG. 1, the vehicle 1 is configured so that a door opening part 2 is provided at a side of a rear seat (not diagrammed) inside the vehicle chamber. The door opening part 2 can be opened and closed by a sliding type door main body 3. The door main body 3 is slidably supported by an upper rail 5 and a lower rail 6, provided along an upper side and a lower side of the door opening part 2 of the vehicle body panel 4, and a center rail 7, provided approximately horizontal to an approximately center position of a rear part of the door opening part 2. A driving mechanism part of the power slide door 10 is provided at the center rail 7, described in more detail below.

In addition, the center rail 7 is provided between an outer side panel and an inner side panel of the vehicle body panel 4. The center rail 7 opens towards the exterior of the vehicle by passing through a slit 8 provided at an outer side panel along the front-rear direction of the vehicle body.

A bracket 11 is provided at a center of a rear end part of the door main body 3 at an interior side of the vehicle chamber, as shown in FIG. 2. A guide roller (not diagrammed), which rolls around inside the center rail 7, is supported by the bracket 11. In addition, a drive unit 13 is provided at the vehicle body panel 4 (an inner side panel) at an interior side of the vehicle chamber. The drive unit 13 comprises an electrically operated motor 12.

The drive unit 13 comprises a drum (not diagrammed), which is driven by the motor 12 to rotate in a normal direction and a reverse direction. A pair of inner cables (not diagrammed) is rolled around the drum in opposing directions. This pair of inner cables is comprised by the operating cable 14. In FIG. 2, only outer tubes 15*a*, 15*b* of the operating cable 14 covering the surrounding areas of each of the inner cables are diagrammed.

Each end of a pair of front and rear outer tubes 15*a*, 15*b* is connected to the drive unit 13 via a tensioner (not diagrammed). Each of the other end is fixed to a front and rear end position of the center rail 7.

The inner cable at a front part side is pulled out from the outer tube 15*a*, then penetrates the vehicle body panel 4 (a panel at an inner side) towards the exterior of the vehicle, changes its direction at a front end side of the center rail 7 towards the rear side of the vehicle body, and is connected to a bracket 11 of the door main body 3. Further, the inner cable at the rear part side is pulled out from the outer tube 15*b*, then penetrates the vehicle body panel 4 (a panel at an inner side) towards the exterior of the vehicle, changes its direction at a rear end side of the center rail 7 towards the front side of the vehicle body, and is connected to the bracket 11 of the door main body 3. Incidentally, a pair of pulley units 16*a*, 16*b* are fixed to each of the front and rear ends of the center rail 7, so that each inner cable can be led and be bent at each end part.

A drum inside the drive unit 13 rotates due to the power provided by the motor 12. As a result, the drum inside the drive unit 13 rolls up one of the inner cables and, at the same time, pulls out the other inner cable by the same amount. Therefore, the bracket 11 is displaced forward and backward inside the center rail 7 according to the direction in which the motor 12 is rotated. Thus, the door main body 3 undergoes a sliding operation at a side part of the vehicle body.

Figure 3:
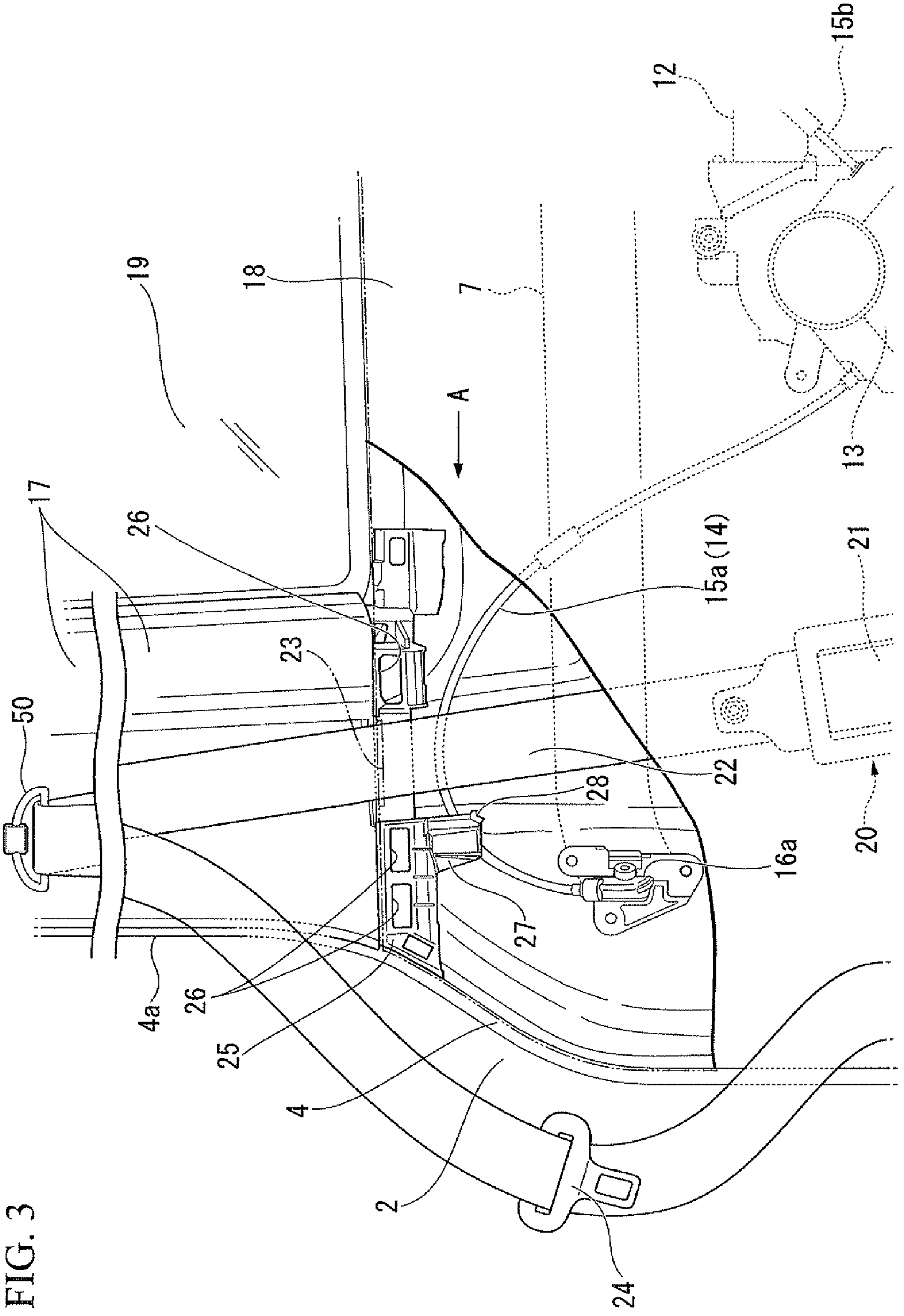
FIG. 3 is a frontal view of a vehicle according to an embodiment of the present invention seen from inside a vehicle chamber by breaking a part of an interior material.
Figure 4:
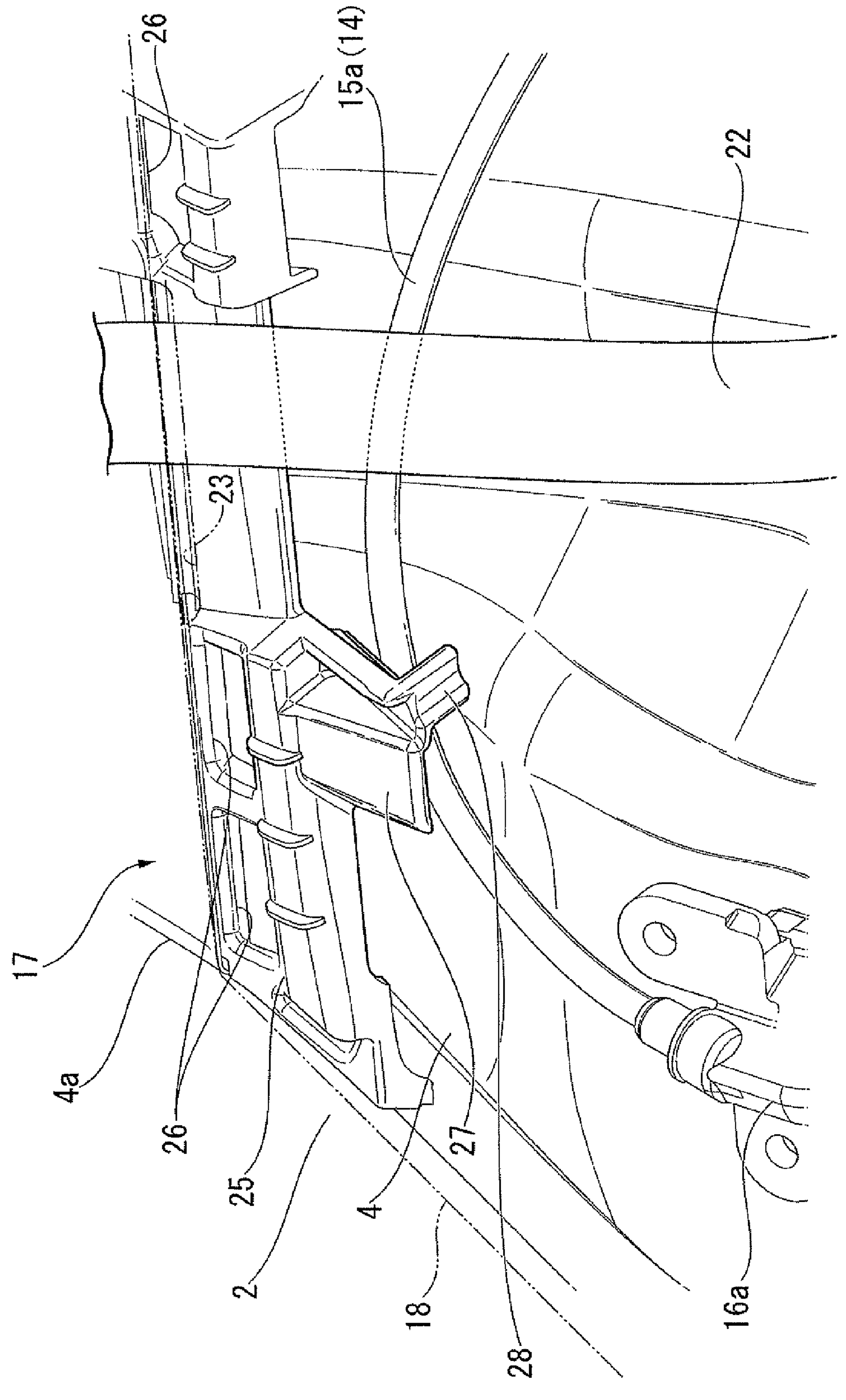
FIG. 4 is a perspective view of a vehicle according to an embodiment of the present invention seen from inside a vehicle chamber.
Figure 5:
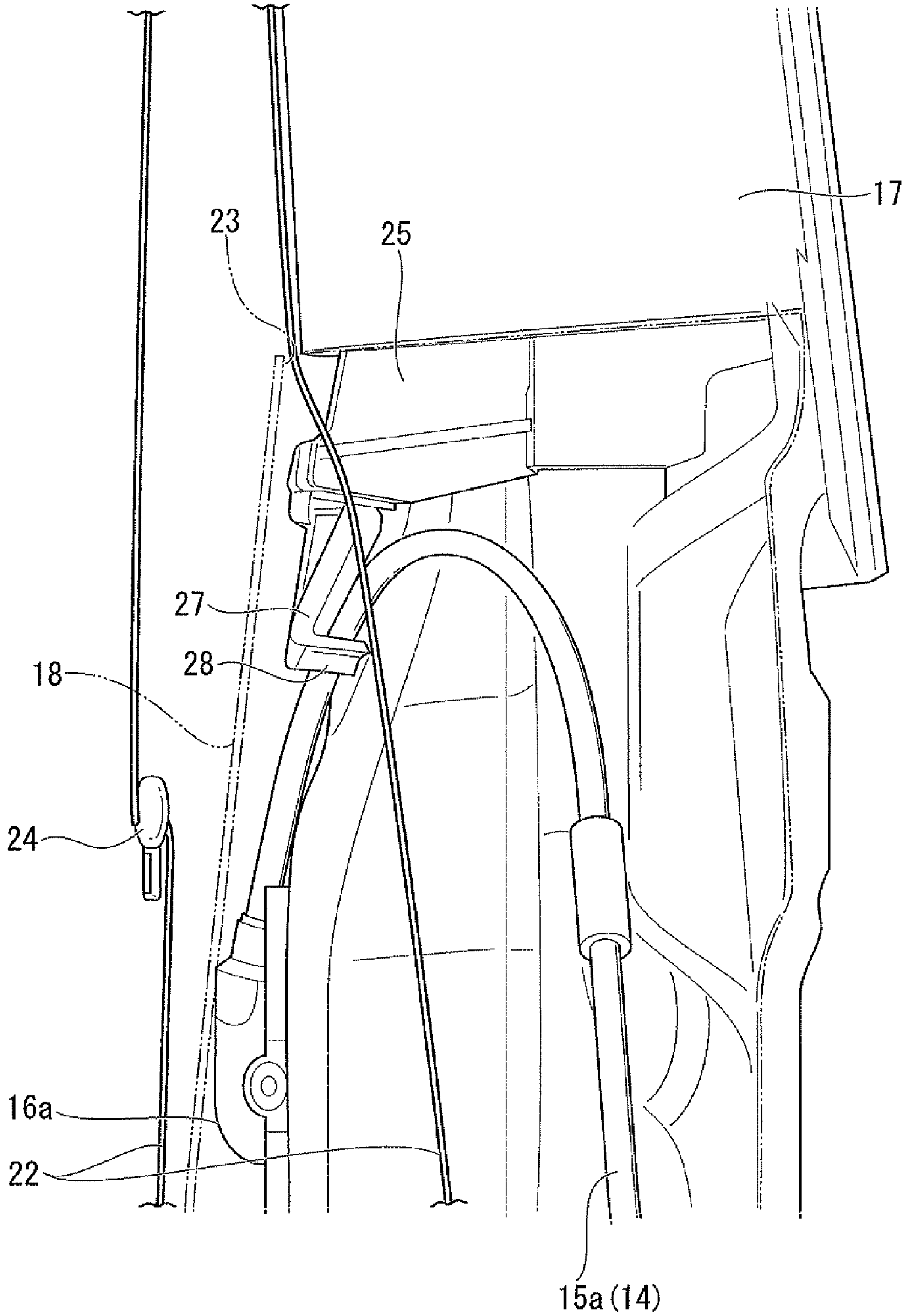
FIG. 5 is a diagram of a vehicle according to an embodiment of the present invention seen from arrow A in FIG. 3.

FIG. 3 is a frontal view of a rear rim part of the door opening part 2 of the vehicle 1, seen from the inner side of the vehicle chamber. FIG. 4 is a perspective view of the same portion shown in FIG. 3, seen from a diagonal downward direction of the inner side of the vehicle chamber. FIG. 5 is a diagram seen from arrow A in FIG. 3.

The rear rim part of the door opening part 2 inside the vehicle chamber is configured so that an inner side of the vehicle body panel 4 (the panel at the inner side) facing the interior of the vehicle chamber is covered by a resin interior material such as a pillar garnish 17 and a side garnish 18 and the like. In particular, a pillar part 4*a*, provided between the door opening part 2 of the vehicle body panel 4 and the side glass 19, is covered by an elongated pillar garnish 17. Meanwhile, a wide region from a lower region of the pillar part 4*a* to a lower region of the side glass 19 is covered by a large side garnish 18.

On the other hand, a retractor 21 of a seatbelt device 20 is fixed to a lower region of the pillar part 4*a* of the vehicle body panel 4 towards the inner side of the vehicle chamber. A webbing 22 is pulled out upwards from the retractor 21. The webbing 22 is passed through a gap between the vehicle body panel 4 and a side garnish 18. Further, the webbing passes through an opening 23, provided between an upper end part of the side garnish 18 and a lower rim of the pillar garnish 17, and is pulled out towards the inside of the vehicle chamber. Incidentally, component 50 in FIG. 3, for example, is a through anchor rotatably supported to a side surface above the pillar garnish 17 inside the vehicle chamber, and supports the upper end of the webbing 22 by bending the webbing 22 downwards. Component 24 in FIG. 3, for example, is a tongue plate engaged with the webbing 22 bent at the through anchor 50. In addition, in order to differentiate between a portion of the webbing 22 pulled out towards the interior of the vehicle chamber and portion pulled around the back side of the side garnish 18, the latter is referred to as the "webbing 22 at the inner side."

Incidentally, in FIGS. 3 and 4, a part of the lower region of the pillar part 4*a* at the front part of the side garnish 18 is broken for ease of representation. As shown in these figures, at a lower side of the pillar part 4*a*, the operating cable 14 (outer tube 15*a*) at a front part side of the power slide door 10 first curves from a predetermined position of the drive unit towards an upper side, then cuts across the back part of the webbing 22 at the inner side 22 towards the front side, then curves slightly downwards, and is connected to the pulley unit 16*a* at a front part side of the vehicle body panel 4 side.

As shown in FIGS. 3-5, a coupled wall 25 is provided extendedly at a lower rim of the pillar garnish 17. The coupled wall 25 is inflected toward the exterior of the vehicle in a step-like manner. At a front surface (a surface towards the interior of the vehicle chamber) of the coupled wall 25, an upper rim part of the side garnish 18 latched so as to overlap with the coupled wall 25. At the coupled wall 25, a plurality of latching holes 26 are provided. A hook part (not diagrammed), protruding from the upper end part of the side garnish, engages with the latching hole 26. Further, a restricting piece 27 is integrated with the coupled wall 25. The coupled wall 25 restricts a displacement of the operating cable 14 (outer tube 15*a*) cutting across the back surface side of the webbing 22 at the inner side.

The operating cable 14 contacts the back surface side of the restricting piece 27. As a result, the restricting piece 27 restricts the operating cable 14 from being displaced in a direction towards the interior of the vehicle chamber by a predetermined length or more. In this way, the restricting piece 27 prevents the operating cable 14 from interfering with the back surface of the webbing 22 at the inner side. Therefore, the back surface of the restricting piece 27 is positioned towards the exterior side of the vehicle by a predetermined distance compared to a position at which the webbing 22 at the inner side passes through.

In addition, a latching hook 28 is integrated with a lower end of a rear part side of the restricting piece 27. The latching hook 28 is bent towards the exterior of the vehicle. This latching hook 28 restricts the operating cable 14 from being displaced below the restricted position determined by the restricting piece (by a distance referred to as a "restricted amount"). When the operating cable 14 is about to be displaced downwards by a restricted amount or more, the latching hook 28 restricts the displacement of the operating cable 14 by coming in contact with the operating cable 14.

As described above, according to a routing structure of the operating cable 14 of the vehicle 1, the displacement of the operating cable 14 in a direction approaching the webbing 22 of the front part of the inner side of the vehicle chamber is restricted by the restricting piece 27 at a lower end of the pillar garnish 17. As a result, even if deflection occurs at a front part of the operating cable 14 due to an operation of a power slide door 10, the operating cable 14 can be reliably prevented from interfering with the webbing 22 at the inner side.

Further, according to this routing structure, the restricting piece is formed so as to be integrated with the pillar garnish 17. As a result, the number of components may be reduced, and the manufacturing cost may be lowered. At the same time, the number of steps required to assemble the components may be prevented from increasing. Therefore, it is possible to simplify the process of assembling the components.

In particular, according to the embodiment described above, the restricting piece 27 is provided at a lower end of the pillar garnish 17 which is attached first to the vehicle body panel 4. Therefore, there is an advantage in that the workability of assembling the components may be improved, because the assembling process may be performed by viewing the restriction in the disposition of the operating cable 14 set by the restricting piece 27, and the front surface side (the inner side of the vehicle chamber) of the restricting piece may finally be covered up by the side garnish 18.

Further, according to the routing structure of the operating cable 14, a locking hook 28, which restricts the downward displacement of the operating cable 14, is integrated to the lower end of the restricting piece 27 of the pillar garnish 17. Therefore, the locking hook 28 can reliably restrict the operating cable 14 from being displaced downwards from the restricted position set by the restricting piece 27. Therefore, when an outer tube 15*a* of the operating cable 14 is pulled during a maintenance operation, for example, the operating cable 14 can be reliably held in place at a position at which the operating cable 14 engages with the restricting piece 27 by the locking hook 28.

While a preferred embodiment of the present invention has been described above, it should be understood that these are exemplary of the invention and are not to be considered as limiting the present invention. Additions, omissions, substitutions, and other modifications can be made without departing from the scope of the present invention. The invention is not to be considered as being limited by the foregoing description, and is only limited by the scope of the appended claims.

What is claimed is:

1. A routing structure of an operating cable of a vehicle comprising a power slide door, the routing structure comprising:

a retractor of a seatbelt device placed between a vehicle body panel and an interior material covering an inner side of a vehicle body panel facing an interior of a vehicle chamber;

a webbing pulled out from the retractor, the webbing being passed through an opening of the interior material, and pulled out from a back part of the interior material towards an inner side of the vehicle chamber;

the operating cable for the power slide door routed between the vehicle body panel and the interior material by crossing over a back part of the webbing, wherein a restricting piece is provided on the interior material, the restricting piece restricting a displacement of the operating cable towards a direction approaching the webbing.

2. The routing structure of the operating cable of the vehicle comprising the power slide door according to claim 1, wherein the restricting piece comprises a locking hook restricting a downward displacement of the operating cable.

3. The routing structure of the operating cable of the vehicle comprising the power slide door according to claim 2, wherein the restricting piece is integrated with a lower part of a pillar garnish covering an inner side of a pillar part of the vehicle body panel facing the interior of the vehicle chamber.

4. The routing structure of the operating cable of the vehicle comprising the power slide door according to claim 1, wherein the restricting piece is integrated with a lower part of a pillar garnish covering an inner side of a pillar part of the vehicle body panel facing the interior of the vehicle chamber.

* * * * *